United States Patent [19]
Shiomi et al.

[11] Patent Number: 5,615,397
[45] Date of Patent: Mar. 25, 1997

[54] APPARATUS USED FOR BLUR SUPPRESSION OR BLUR PREVENTION

[75] Inventors: Yasuhiko Shiomi, Kawaguchi; Shinji Imada, Musashino, both of Japan

[73] Assignee: Canon Kabushiki Kaisha, Tokyo, Japan

[21] Appl. No.: 364,223

[22] Filed: Dec. 27, 1994

[30] Foreign Application Priority Data

Dec. 28, 1993 [JP] Japan .................................... 5-334411

[51] Int. Cl.⁶ .................................................... G03B 17/00
[52] U.S. Cl. .................................................... 396/55; 348/208
[58] Field of Search .................................. 354/202, 400, 354/430, 195.12, 70; 348/208; 396/439, 55

[56] References Cited

U.S. PATENT DOCUMENTS 5,117,246   5/1992   Takahashi et al. ................ 354/202
5,175,580  12/1992   Shiomi .............................. 354/410
5,229,603   7/1993   Shiomi ........................... 250/231.1

*Primary Examiner*—David M. Gray
*Attorney, Agent, or Firm*—Fitzpatrick, Cella, Harper & Scinto

[57] ABSTRACT

An undesired signal contained in a signal related to blur suppression, e.g., an error output signal contained in a blur detection signal and obtained upon generation of a shock, is stored. When the state represented by the signal is determined without using the signal, and an undesired state is determined, e.g., when a state in which an error output signal is contained in a blur detection signal is predetermined from the state of a structure for generating a shock or impact, the signal related to blur suppression is accordingly synthesized with the stored undesired signal, e.g., the error output signal is subtracted from the blur detection signal, thereby forming a corrected signal for blur suppression, to perform a blur suppression operation in accordance with the corrected signal.

19 Claims, 16 Drawing Sheets

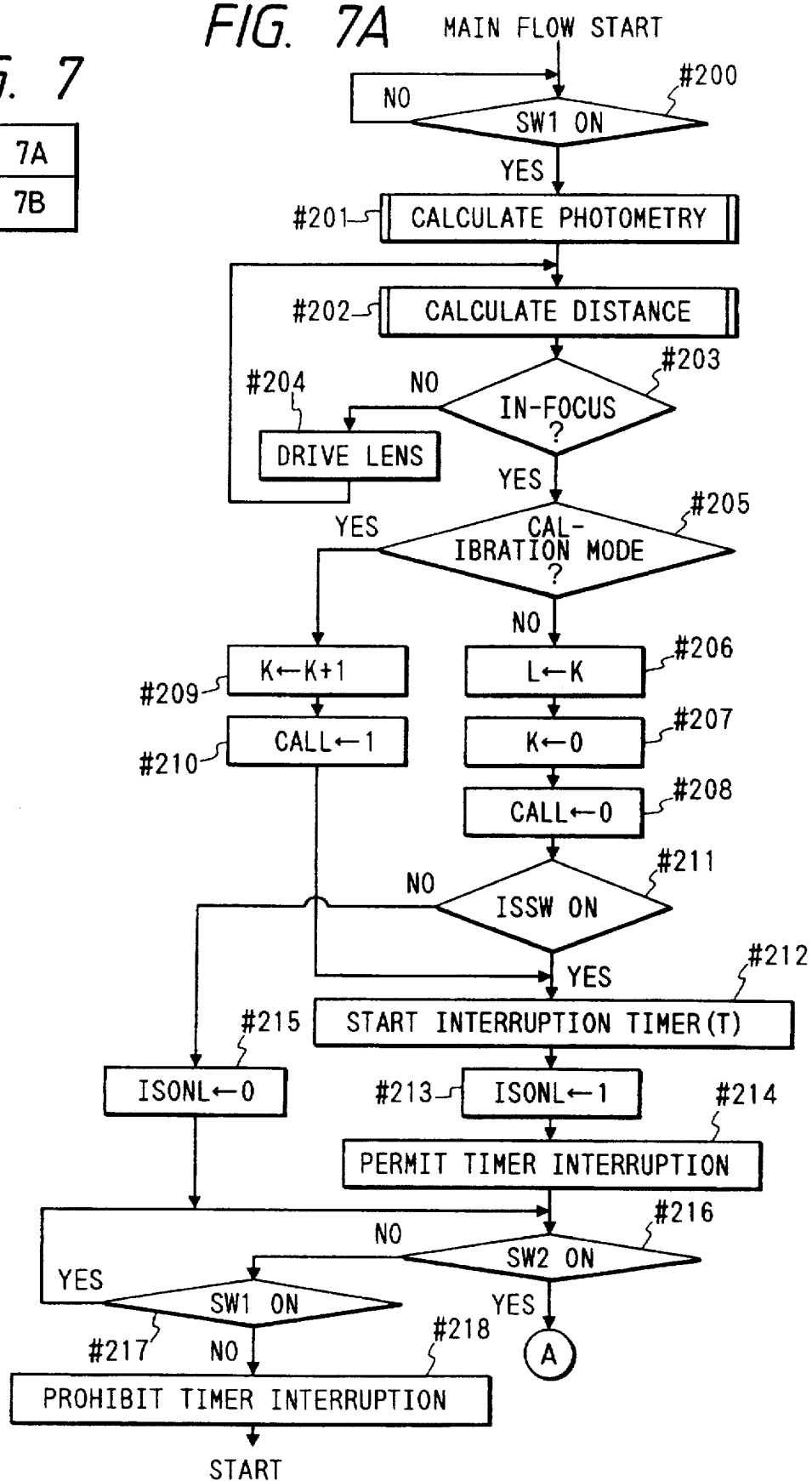

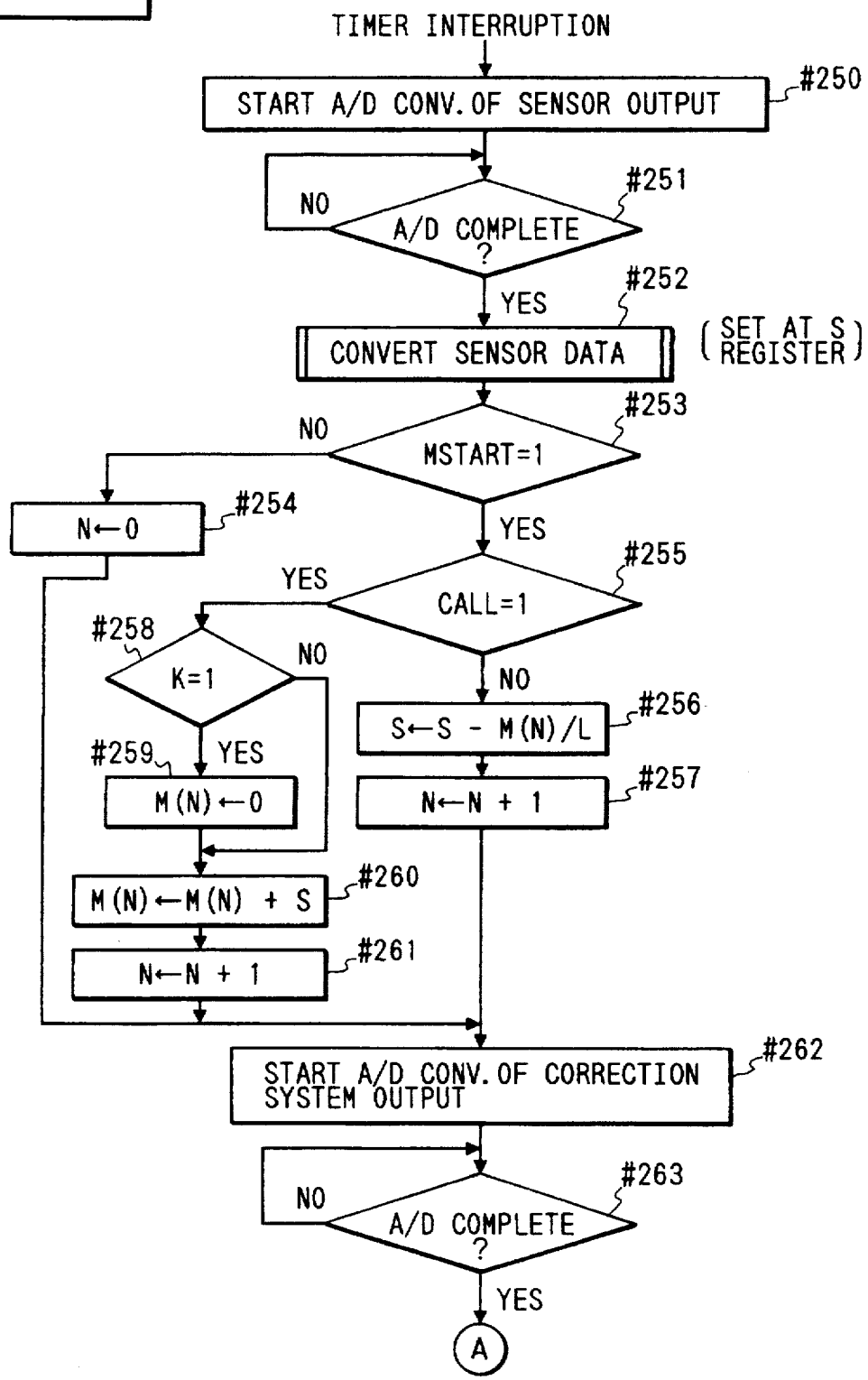

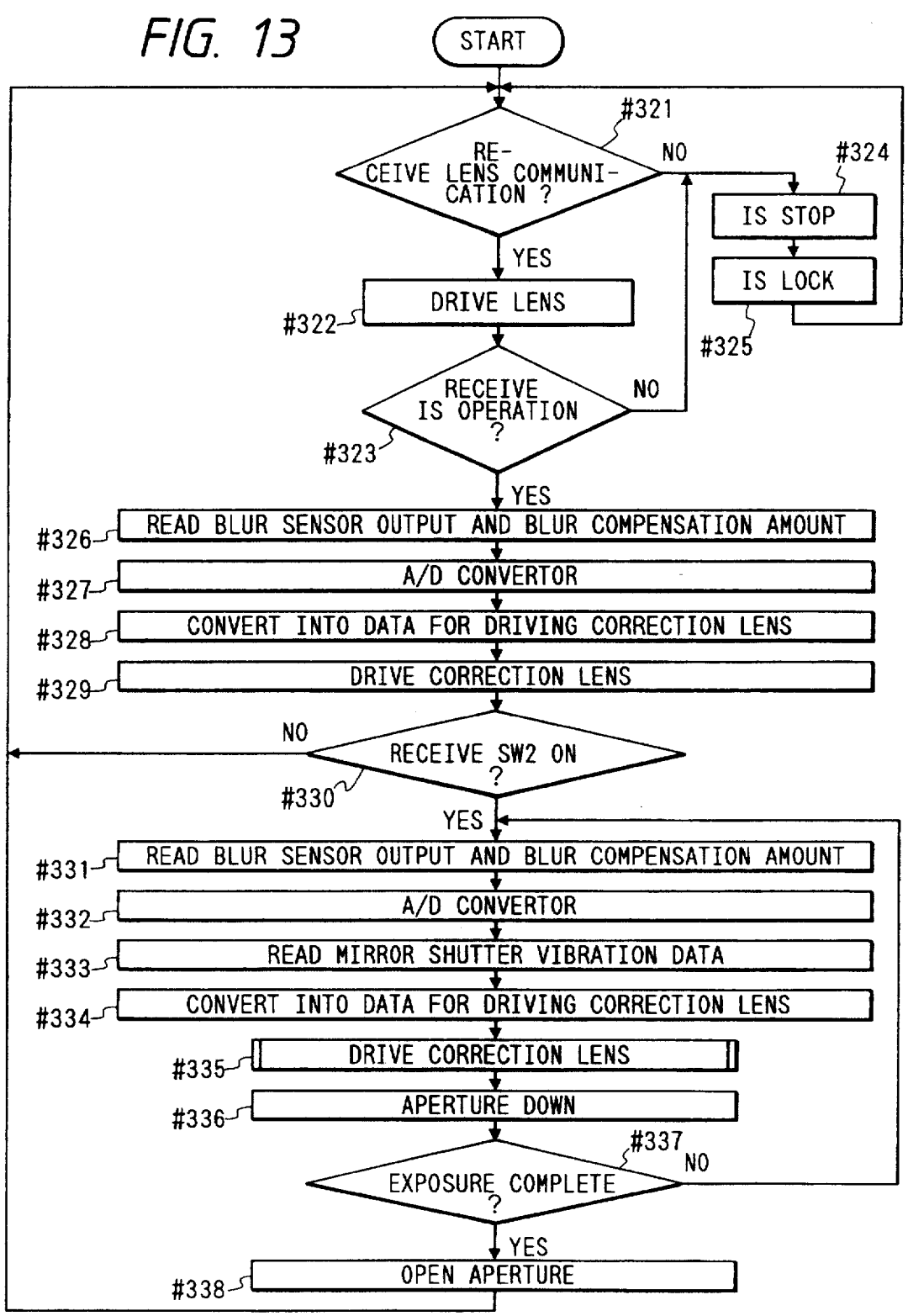

APPARATUS USED FOR BLUR SUPPRESSION OR BLUR PREVENTION

BACKGROUND OF THE INVENTION

1. Field of the Invention

The present invention relates to an apparatus used to suppress or prevent a blur generated due to, e.g., a camera shake.

2. Related Background Art

Conventional anti-vibration apparatus for suppressing or preventing a blur of a camera may include a sensor (e.g., a vibration gyro) which detects the vibration amount of a camera main body. In accordance with an output from the sensor, a correction optical system movable in an x-y plane perpendicular to the optical axis is driven, thereby suppressing or preventing a blur generated due to the camera shake of a photographer.

However, the sensor used in a conventional anti-vibration apparatus of this type is constituted by very small mechanical components, as represented by a vibration gyro. Because of this structure, an error signal different from an original sensor signal is undesirably generated due to a large impact such as a mirror shock or shutter shock in the camera.

A blur of a camera, which is generated due to a mirror-up or shutter running operation, has a very high frequency, and a currently available blur sensor cannot accurately detect a blur of a camera at such a high frequency.

Even when a blur of a camera at a high frequency can be detected, a phase delay is generated in a blur correction system upon correction of a blur at a high frequency of 100 Hz or more. Since the blur correction system cannot, therefore, sufficiently follow the blur, blur correction cannot be accurately performed.

In addition, a mirror or shutter blur changes depending on whether the camera is supported by a user or by a tripod. When a blur correction apparatus is incorporated in an interchangeable lens for a single-lens reflex camera, the blur also changes depending on the type of camera attached to the lens.

When an error signal different from an original blur is output, the correction system is driven in accordance with the output. For this reason, the operation of the anti-vibration apparatus sometimes undesirably causes an increase in blur.

SUMMARY OF THE INVENTION

According to one aspect of the present invention, there is provided a blur suppression apparatus, an apparatus adapted to be used in the blur suppression apparatus, or an optical equipment such as a camera, comprising;

first means for storing a predetermined signal;

second means for automatically determining a state of a first signal related to blur suppression, the second means performing determination without using the first signal; and third means for synthesizing the first signal and the predetermined signal stored in the first means so as to form a second signal related to blur suppression in accordance with a determination result from the second means.

With this arrangement, an appropriate blur suppression operation can be performed in accordance with an appropriate signal.

According to another aspect of the present invention, there is provided a blur suppression apparatus, an apparatus adapted to be used in the blur suppression apparatus, or an optical equipment such as a camera, comprising;

first means for pre-storing a predetermined signal, the first means being capable of updating a stored content; and second means for synthesizing the first signal related to blur suppression and the predetermined signal stored in the first means so as to form a second signal related to blur suppression.

With this arrangement, an appropriate blur suppression operation can be performed in accordance with an appropriate signal.

BRIEF DESCRIPTION OF THE DRAWINGS

FIG. 13 is a flow chart showing the operation procedures of the third embodiment of the present invention.

DETAILED DESCRIPTION OF THE PREFERRED EMBODIMENTS (First Embodiment)

Figure 1:
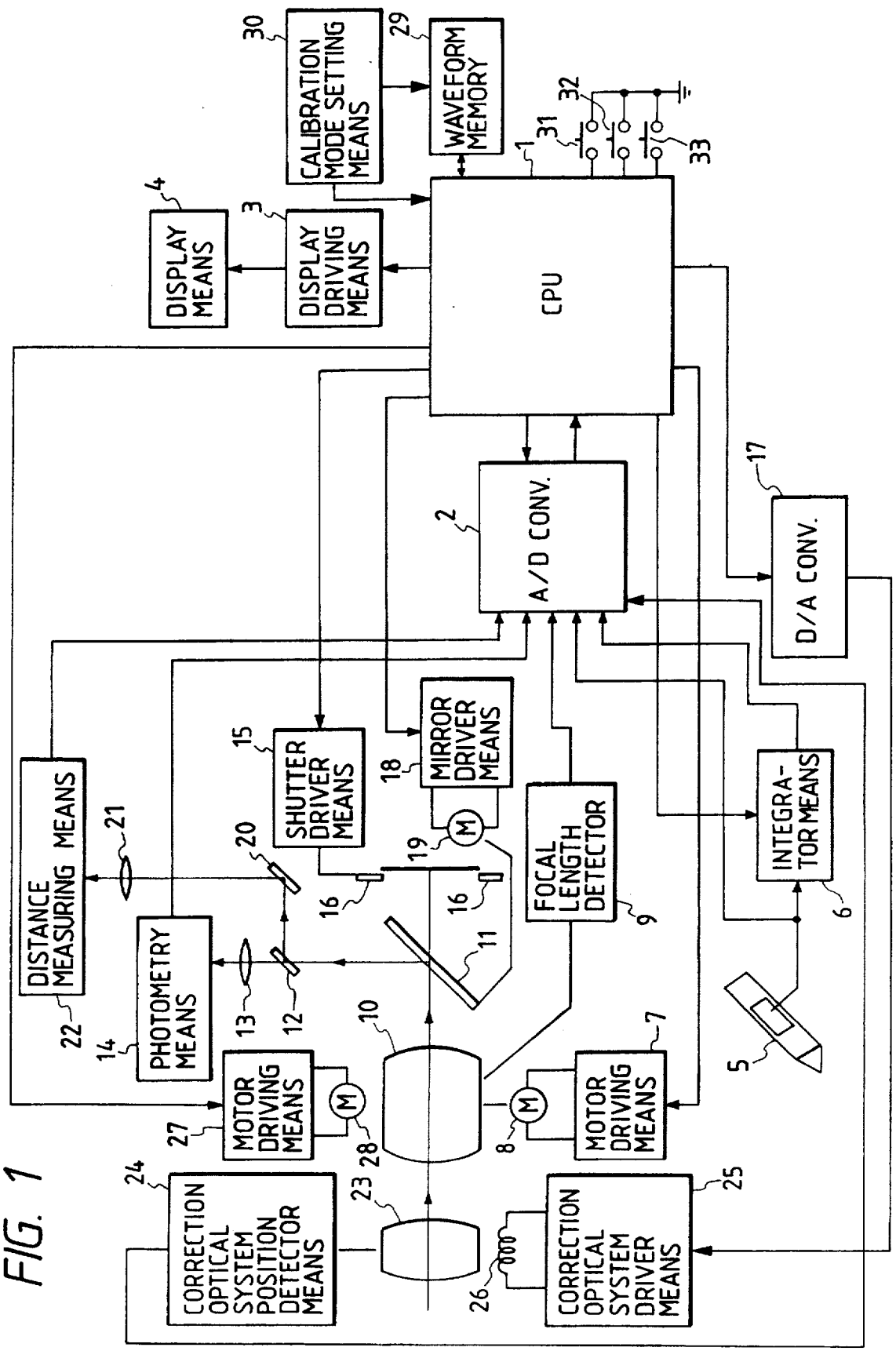
FIG. 1 is a block diagram showing the entire arrangement of the first embodiment of the present invention.
Figure 2:
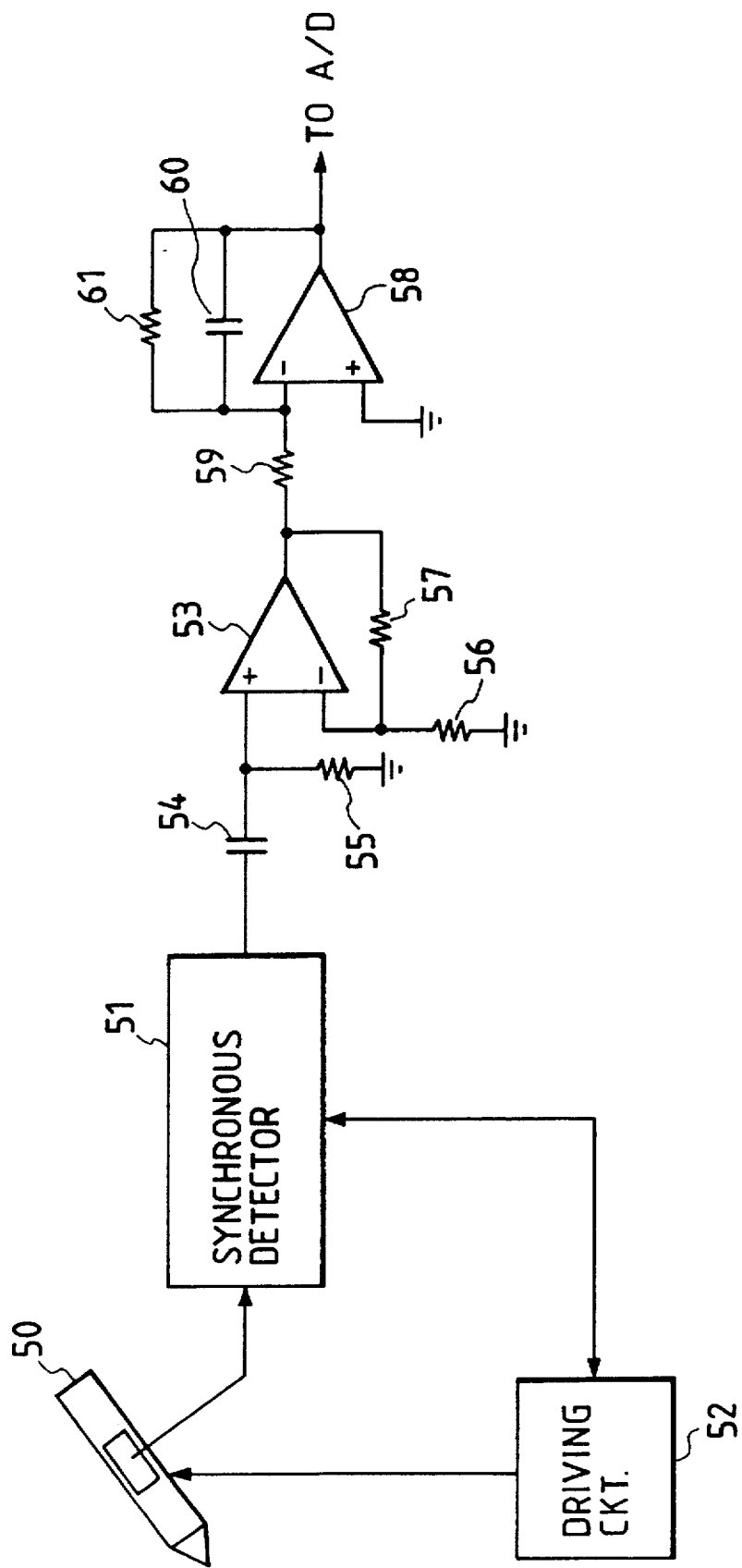
FIG. 2 is a diagram showing the detailed arrangement of a sensor, shown in FIG. 1, for detecting a blur.

FIG. 1 is a block diagram showing the entire arrangement of the first embodiment of the present invention. A CPU 1 controls the entire camera and the anti-vibration system of the present invention. An output from a sensor 5 for detecting a blur of the entire camera is converted into a displacement by an integrator 6 and input to an A/D converter 2. The input is converted into a digital value by the A/D converter 2 and the digital value is fetched in the CPU 1. On the other hand, the CPU 1 performs predetermined operations (to be described later) of the camera in accordance with the states of operation switches 31 to 33 of the camera. When a calibration mode setting means is selected, an output from the blur sensor is fetched in a waveform memory 29 at a predetermined timing. FIG. 2 shows the detailed arrangement of the sensor 5 and the integrator 6. In FIG. 2, an actual vibrator 50 is resonated by a driving circuit 52, and the output from the vibrator 50 is converted by a synchronous detector and the like to obtain a predetermined angular velocity output. The output from the synchronous detector normally includes an unnecessary DC offset component, and this DC component is removed by a high-pass filter constituted by an OP amplifier 53, a capacitor 54, and resistors 55 to 57. Only the normal camera shake angular velocity component is converted into a displacement by an integrator constituted by an OP amplifier 58, a capacitor 60, and resistors 59 and 61.

Referring to FIG. 1, the position displacement of an actual correction optical system 23 is detected by a correction optical system position detector 24. An output from the correction optical system position detector 24 is fetched in the CPU 1 through the A/D converter 2. In the CPU 1, feedback calculation control is executed to always equalize the sensor output with the position output from the correction optical system. The calculation result is applied to a correction optical system driver 25 through a D/A converter 17. A correction optical system driving coil 26 receives power from the correction optical system driver 25. The correction optical system 23 is driven by the driving force of the driving coil 26.

Figure 3:
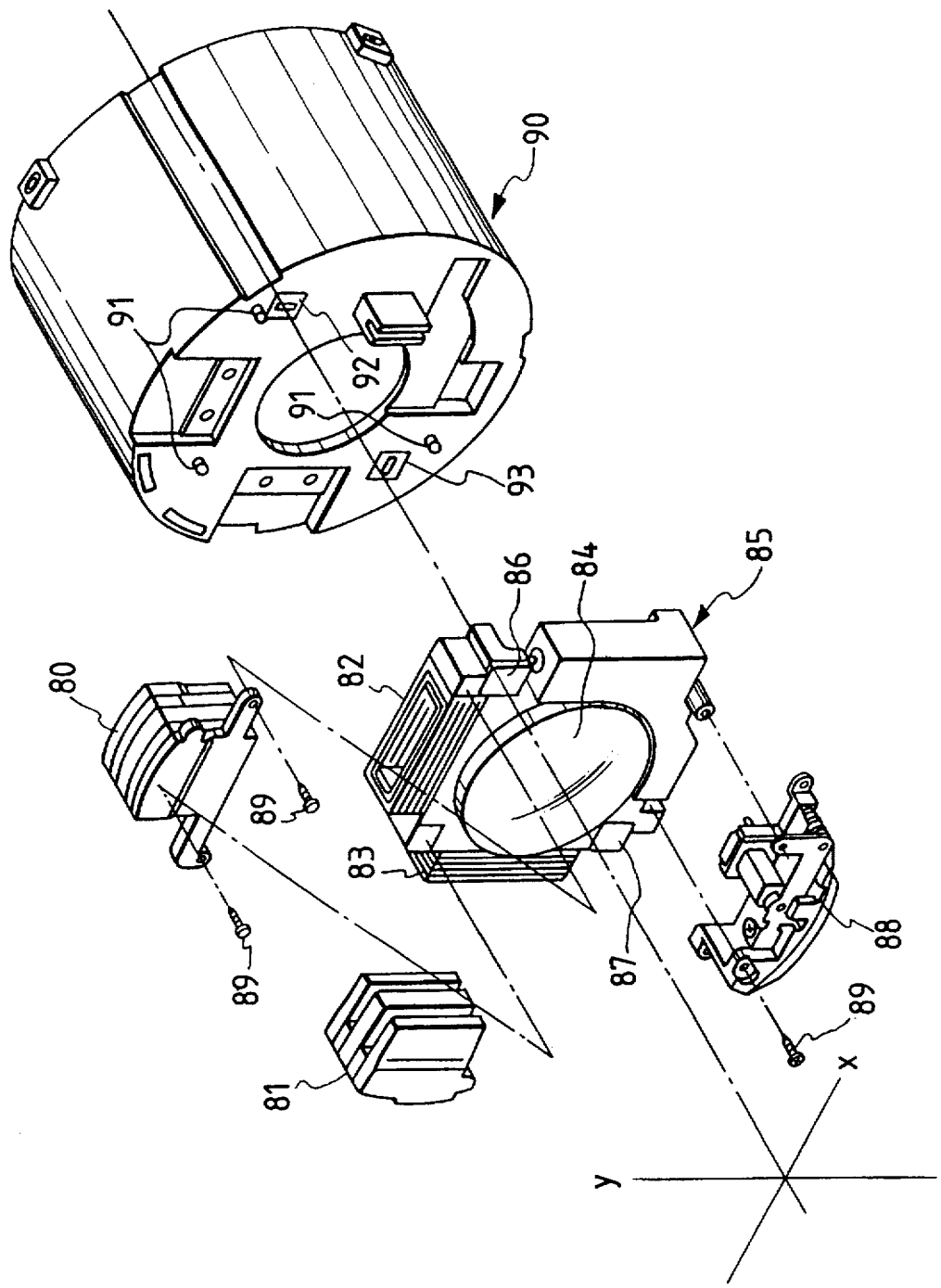
FIG. 3 is a perspective view showing the detailed arrangement of a correction optical system in FIG. 1.

FIG. 3 shows the detailed arrangement of the optical correction system 23. FIG. 3 illustrates the arrangement of a so-called shift optical system which decenters and corrects an optical path of a light beam incident on a camera photographing optical system by translating a lens in x and y directions perpendicular to the optical axis. Yoke portions 80 and 81 as magnetic circuit units serve as actual drive sources in the x- and y-axis directions, and coils 82 and 83 respectively correspond to the yoke portions 80 and 81. When these coil portions receive power from the above-described correction optical system driver 25, a lens 84 as a portion of a photographing lens is decentered in the x and y directions, as shown in FIG. 3. The lens 84 is fixed by a support frame & support arm 85. The actual movement of the lens 84 is detected in a non-contact manner by combinations of IREDs 86 and 87 which move together with the lens, and PSDs 92 and 93 attached to a lens barrel portion 90 for holding the entire shift lens. A mechanical lock mechanism 88 mechanically holds the lens at substantially the central position of the optical axis when energization to the shift system is stopped. Charge pins 89 are attached to the yoke portion 80, and a support ball 91 serves as an anti-tilt member, which regulates the tilt direction of the shift system.

Figure 4:
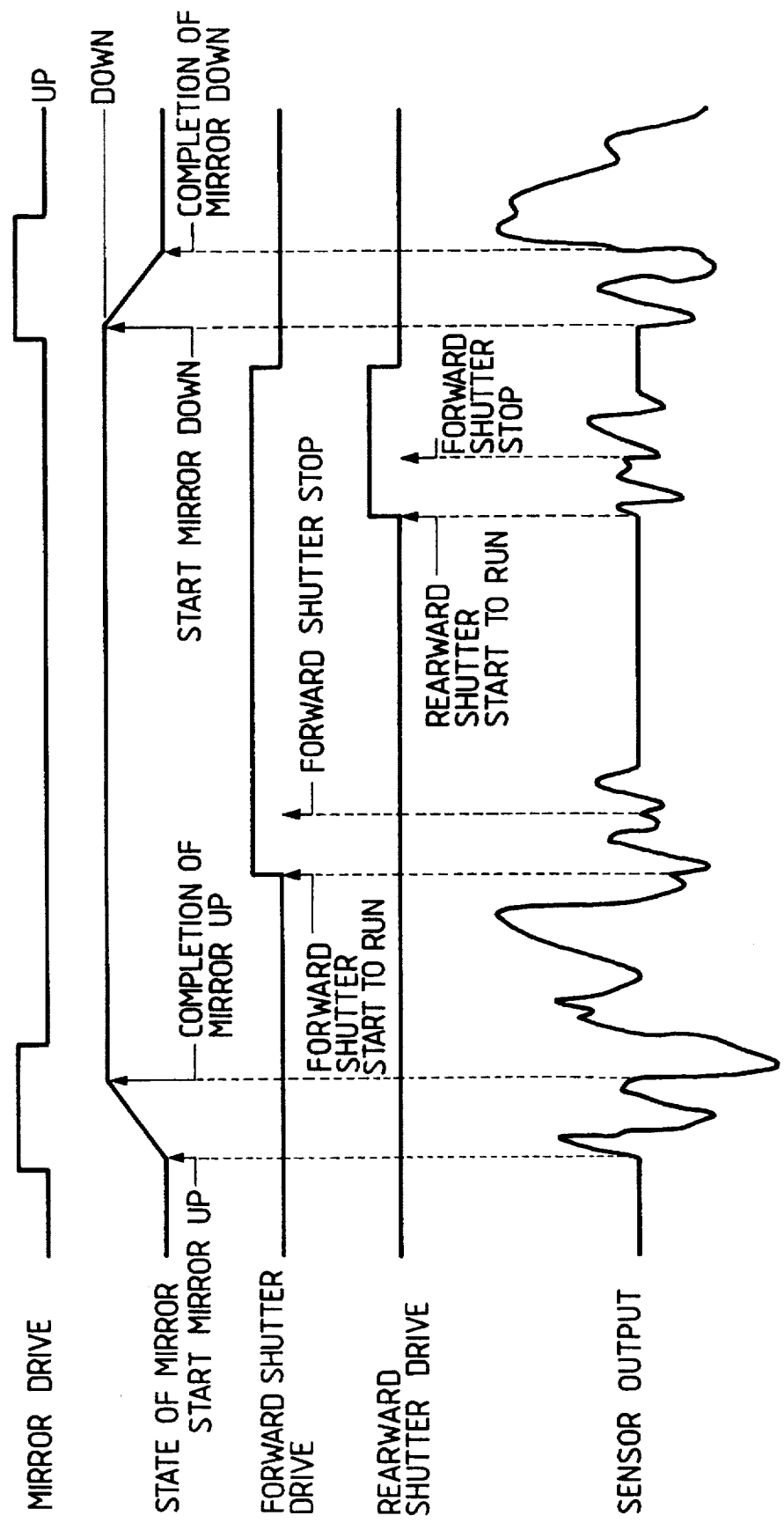
FIG. 4 is a chart showing a sensor output along the timing chart of the release operation of a camera.
Figure 5:
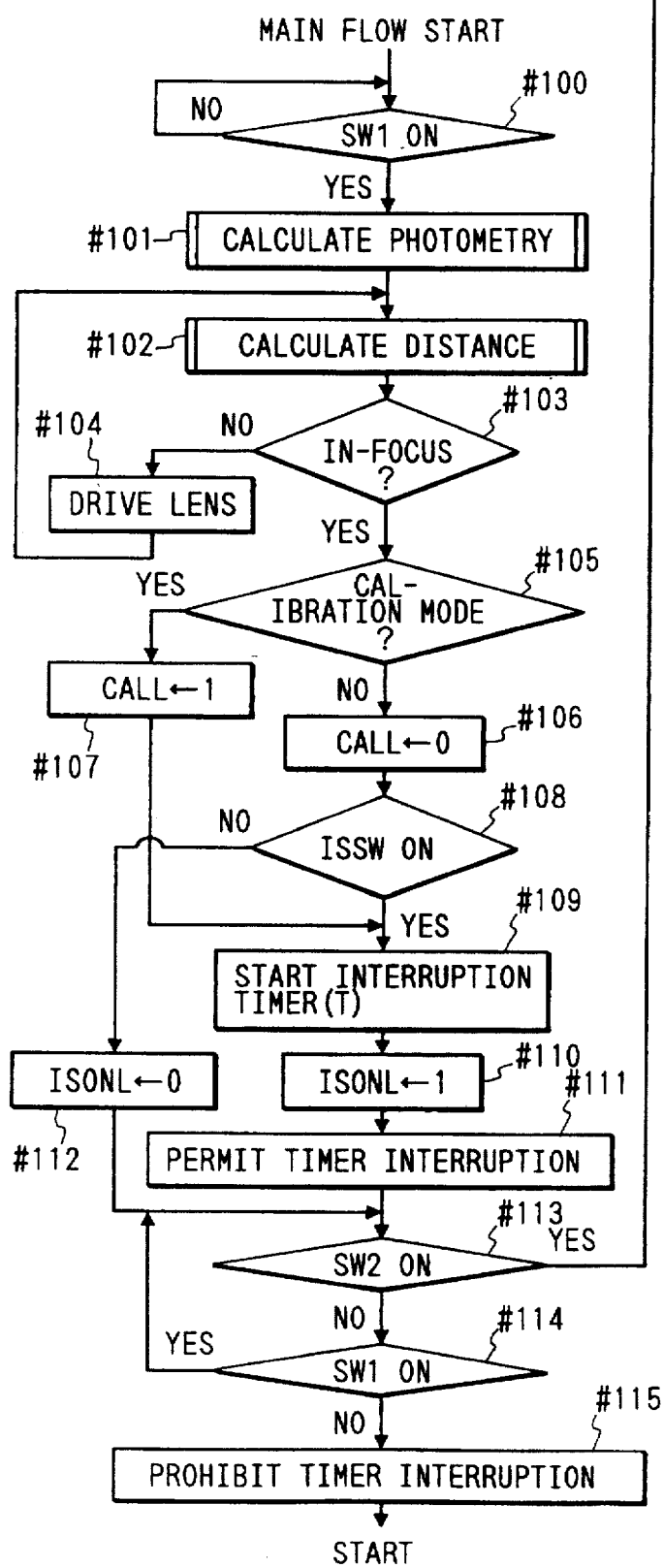
FIG. 5 is a flow chart showing the operation of the first embodiment of the present invention.
Figure 5:
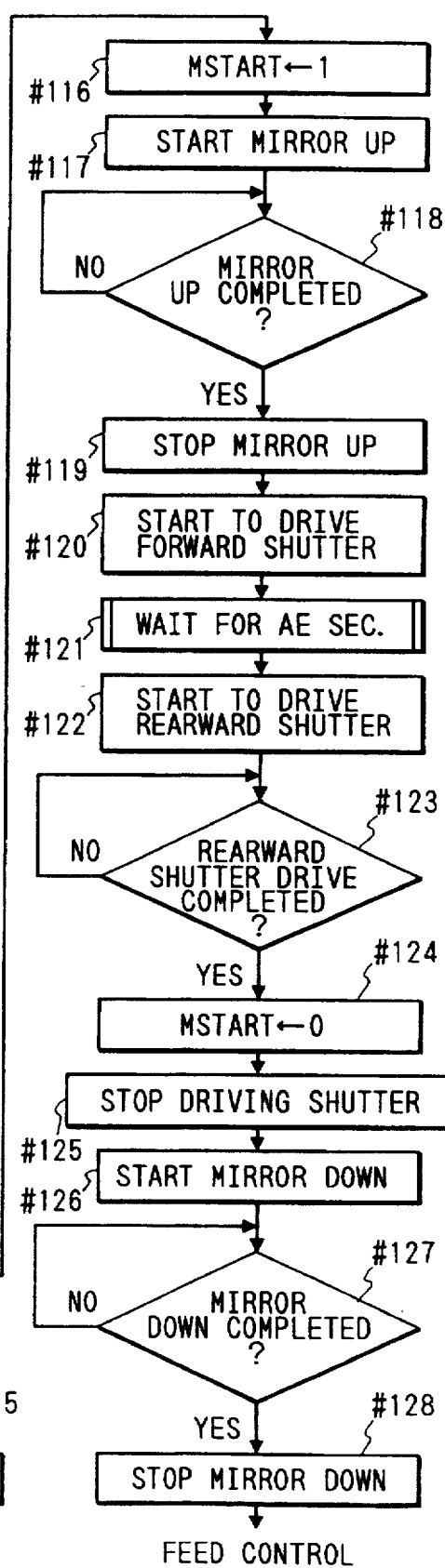

The detailed control operation of this embodiment will be described below with reference to FIGS. 4 and 5 showing the waveform of a sensor output error along the timing chart of the release operation of the camera in a stationary state, and a flow chart of the operation, respectively.

First of all, FIG. 4 will be described below. An error is generated in a sensor output in accordance with an actual mirror-up start operation upon energization to a mirror. A large error is generated again upon completion of the mirror-up operation. After the elapse of a predetermined period of time, the forward shutter starts to run, and an error is accordingly generated. An error is also generated upon stop of running of the forward shutter. When the rearward shutter starts to run, a large error is generated again in synchronization with the start and stop of running of the rearward shutter. Finally, an error is generated in synchronism with a mirror-down operation.

In correspondence with such a situation, an operation as shown in FIG. 4 and the flow chart of FIG. 5 is performed in this embodiment. In step #100, it is checked whether an SW1 (switch 31) is turned on upon the release operation of the camera. If YES in step #100, a photometry calculation is immediately performed to determine actual shutter exposure conditions in step #101. More specifically, as shown in FIG. 1, a light beam incident from an object surface through the correction optical system 23 and a photographing optical system 10 is regularly reflected by a main mirror and thereafter incident, through a sub mirror 12 and a photomerry optical system 13, on a photomerry means 14 constituted by a photomerry sensor and peripheral circuits. An output form the photomerry means, which corresponds to the luminance level of the object, is fetched in the CPU 1 through the A/D converter 2, and a predetermined photomerry calculation as described above is executed. In step #102, a light beam similarly incident through the correction optical system 23 and the photographing optical system 10 is incident on a distance measuring means 22 through a main mirror 11, sub mirrors 12 and 20, and an AF optical system 21. An output from the distance measuring means 22 is fetched in the CPU 1 through the A/D converter 2, and a predetermined distance calculation (determination whether an in-focus state is set) is performed. In step #103, it is checked whether the result of the distance calculation indicates an in-focus state. If NO in step #103, a focus motor 28 is energized through a motor driving means 27 in accordance with a control signal from the CPU 1 to actually drive the focus lens in the direction of the optical axis in step #104. The operation in steps #102 to #104 is repeated until an in-focus state is detected. When YES in step #103, the flow advances to step #105 to determine whether the calibration mode setting means of the sensor is selected. If NO in step #105, a latch CALL in the CPU is reset in step #106. If the camera main body is set in the calibration mode, the flow advances to step #107 to set the latch CALL to be "1", and then advances to step #109.

In step #108, it is checked whether an ISSW (switch 33) for selecting the operation of the anti-vibration apparatus of this embodiment is ON. If YES in step #108, a timer for generating a timer interruption (to be described later) each predetermined period T starts in step #109. In step #110, a latch ISONL in the CPU is set to be "1". In step #111, an actual timer interruption operation is permitted. If NO in #108, the anti-vibration apparatus need not be operated, so the latch ISONL is only reset to "0" in step #112. In step #113, it is checked whether an SW2 (switch 32) for starting an actual shutter release operation by the photographer is turned on. If YES in step #113, the flow jumps to step #116; otherwise, the flow advances to step #114 to determine the state of the SW1 again. If the SW1 is in an ON state, the flow returns to step #113 to determine the state of the switch; otherwise, the above-mentioned timer interruption is prohibited in step #115, and the flow returns to step #100. Processing in steps #116 to #128 is related to an actual release sequence. In step #116, a latch MSTART in the CPU 1, which indicates a release sequence state, is set to be "1". In step #117, a mirror driver 18 is operated in accordance with a control signal from the CPU 1. A mirror driving motor 19 is energized in accordance with an output from the mirror driver 18 to start an up operation of the mirror 11. In step #118, it is checked whether the up operation of the mirror 11 is completed. If YES in step #118, energization to the motor 19 is stopped in step #119. In step #120, energization of the forward shutter portion of a shutter 16 is started through a shutter driver 15 in accordance with a control signal from the CPU 1, thereby starting to drive the forward shutter. In step #121, the control waits for only a period of time corresponding to AE seconds calculated in step #101. In step #122, drive of the rearward shutter is started. In step #123, it is checked whether the rearward shutter drive is completed. If YES in step #123, the latch MSTART is reset to "0" again in step #124. In step #125, energization to the forward and rearward shutters is stopped. In step #126, a mirror-down operation is started through the mirror driver 18 and the motor 19. If completion of the mirror-down operation is detected in step #127, the mirror-down operation is stopped in step #128, thereby ending the shutter release sequence.

The above-described timer interruption will be described below with reference to FIGS. 6A and 6B.

In step #150, A/D conversion of an output from the sensor 5 or 6 as shown in FIG. 1 is started. In step #151, it is checked whether the A/D conversion is completed. If YES in step #151, the flow advances to step #152 to convert the sensor output data into an appropriate form (e.g., data added with a sign), and the result is set in a register S in the CPU.

In step #153, it is checked whether the value of the latch MSTART indicating that the actual control is in the shutter release operation is set to be "1". If this value is set to be "0", the flow advances to step #154 to reset the value of an address counter N of a waveform memory (to be described later) to "0". Therefore, before the shutter release operation is started, the value of the address counter is kept to be "0" in an initialized state. On the other hand, in step #155, the state of the latch CALL representing the calibration mode is checked. If the latch CALL is set to be "1", it is determined that the calibration state is set. In step #158, the value of the register S, which corresponds to the sensor data result is stored in a memory M (N) represented by the address counter N in the waveform memory. In step #159, the value of the address counter is incremented by one to set an address for setting sensor data for the next timer interruption. In this manner, when a mirror-up operation of the camera is started, a result from the blur sensor, which is fetched by the timer interruption, is sequentially fetched in the waveform memory. The fetching operation is finished upon completion of the mirror-down operation. The sensor error waveform in the stationary state of the camera (since camera shake data is also contained in a state in which the camera is carried by a user, calibration is performed in the stationary state) as shown in FIG. 4 is fetched.

On the other hand, if the latch CALL is reset to "0" in step #155, it is determined that a normal photographing state is set, and the flow advances to step #156. In step #156, the value of the memory M (N) indicated by the address N in the above-described waveform memory is subtracted from the value of the register S in which the sensor data result is set, and the subtraction result is set in the register S again. In step #157, the value of the address counter is incremented by one to indicate the next waveform memory data. In this case, the error signal (this error signal normally has a reproducibility) stored in the waveform memory in advance is subtracted from a sum of the error signal and the camera shake signal output from the sensor. Therefore, a true camera shake signal is set in the register S.

In step #160, conversion of an output from the correction optical system position detector 24 into digital data by the A/D converter 2 is started. If completion of conversion is detected in step #161, the data value is set in a register T in step #162. In step #163, the state of a flag ISONL indicating whether an anti-vibration operation is executed is checked. If this latch is set to be "1", the flow advances to step #165. If this latch is reset, it is determined that an anti-vibration operation is not executed, and the flow advances to step #164 to reset the value of the register S to "0H". The above-mentioned sensor data becomes invalid. In step #165, the value of the register T in which the position data of the correction optical system is set is subtracted from the value of the register S in which a result corresponding to the sensor data is set, and the subtraction result is set in the register S again. In step #166, the value of the register S is multiplied by the value of a gain LPG in a correction optical system driving feedback loop. Processing in steps #167 to #169 is a phase compensation calculation necessary for achieving the feedback loop of the correction optical system. In step #167, a multiplication value of a proportionality constant B1 and the value of the register in which the calculation result in the preceding interruption is set is subtracted from the value of the register S in which a value obtained upon amplification of the difference between the sensor data and the position data of the correction optical system, and the obtained value is set in a register D. In step #168, a multiplication value of the value of the register D and a proportionality constant A0 is added to a multiplication value of the value of the register C, which is calculated in the preceding calculation, and a proportionality constant A1, and the obtained value is set in a register E as a final calculation result. The constant values A0, A1, and B1 used for the calculations are calculated by conventional S-Z transform (since this method is known well, and a detailed description thereof will be omitted) to satisfy predetermined phase compensation frequency characteristics. In step #169, the value of the register D, which is calculated in step #167, is set in the register for calculation control in the next interruption, thereby ending the phase compensation calculation.

In step #170, the value of a register E is transferred to the D/A converter 17 as DADATA as the calculation result. The correction optical system is driven on the basis of the calculation result through the correction optical system driver 25. In this embodiment, only one axial direction of the yaw and pitch directions is described as a control direction. However, the control method is the same in both directions, and a detailed description thereof will be omitted. In step #171, a timer interruption flag is cleared, thereby ending the interruption.

(Second Embodiment)

Figure 7B:
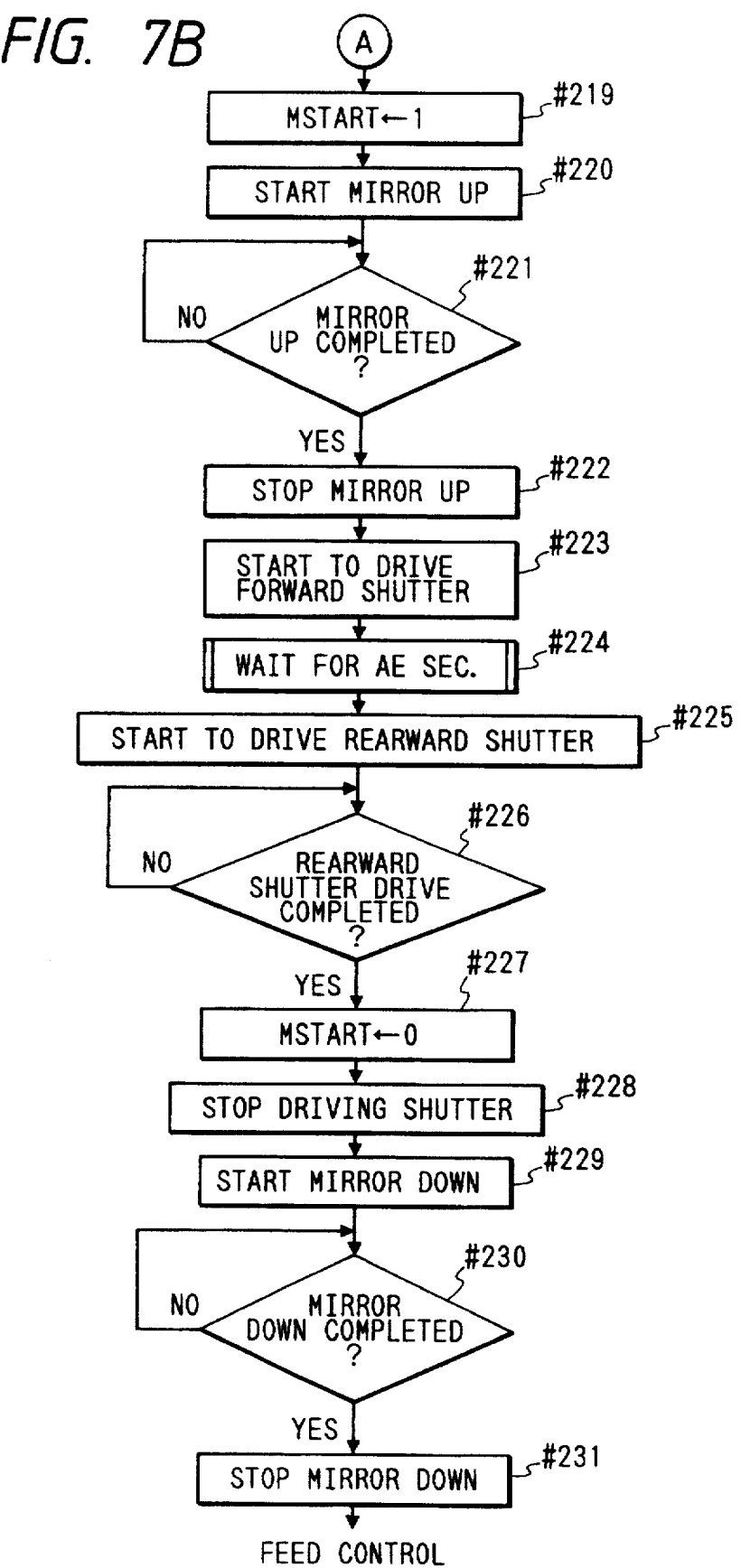
FIG. 7 is comprised of FIGS. 7A and 7B showing the flow charts illustrating the operation of the second embodiment of the present invention.

The second embodiment of the present invention will be described below with reference to flow charts in FIGS. 7A, 7B, 8A and 8B. Processing in steps #200 to #205 in FIGS. 7A and 7B is the same as that in steps #100 to #105 in FIG. 5, and a detailed description thereof will be omitted. If it is determined in step #205 that the calibration mode is not set, the flow advances to step #206 to set the value of a register K in which the number of waveform storage operations in the calibration mode is set in a register L. In step #207, the value of the register K is reset to "0", and thereafter, a latch CALL is reset to "0" in step #208, as described in the first embodiment. If it is determined in step #205 that the calibration mode is set, the flow advances to step #209 to increment the value of the register K in which the number of waveform storage operations is set by one. In step #210, the latch CALL is set to be "1". Processing in steps #211 to #231 is the same as that in steps #108 to #128 in FIG. 5, and a detailed description thereof will be omitted.

Figures 6, 6A:
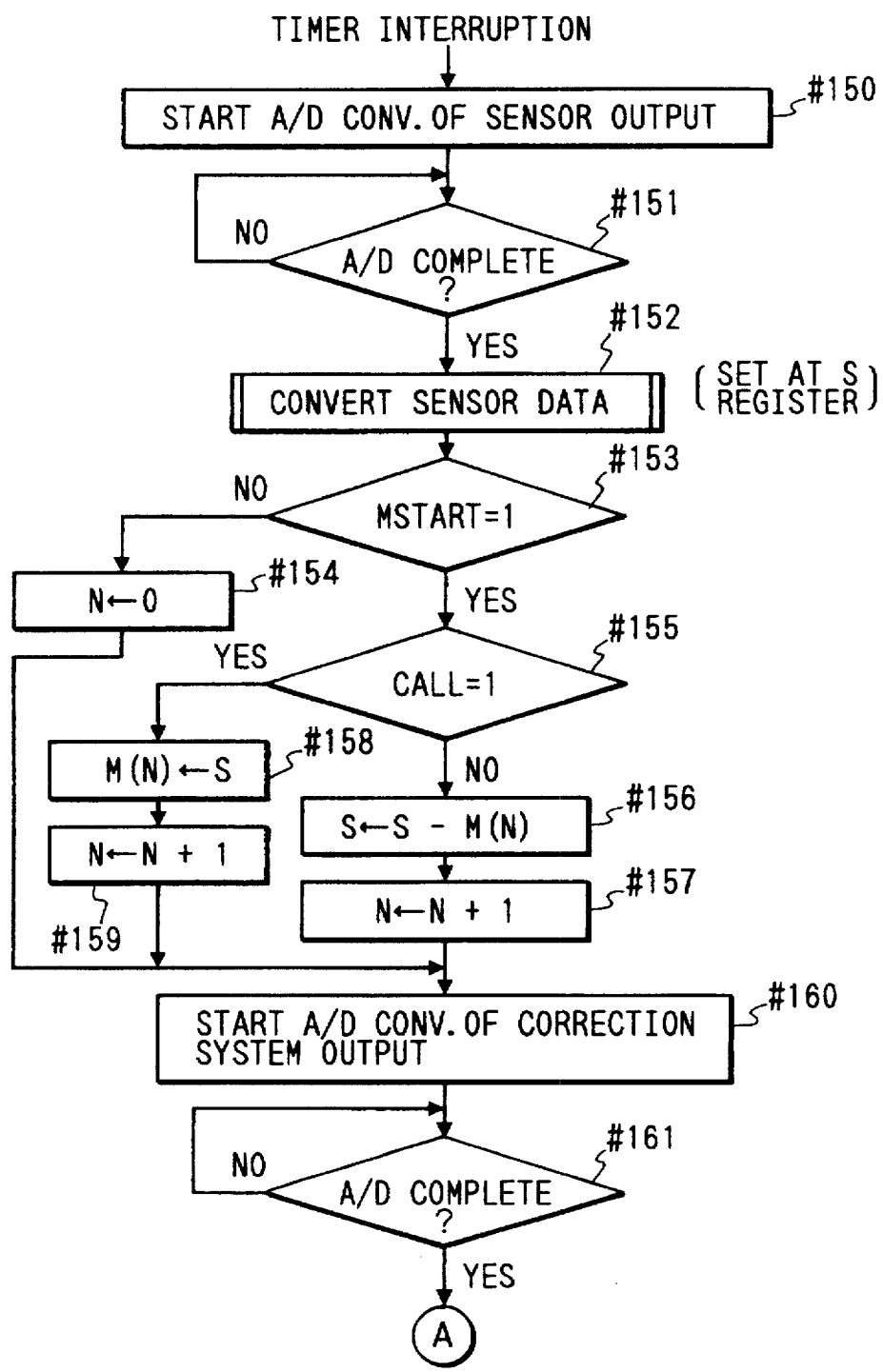
FIG. 6 is comprised of FIGS. 6A and 6B showing flow charts illustrating the operation of the first embodiment of the present invention.
Figure 6B:
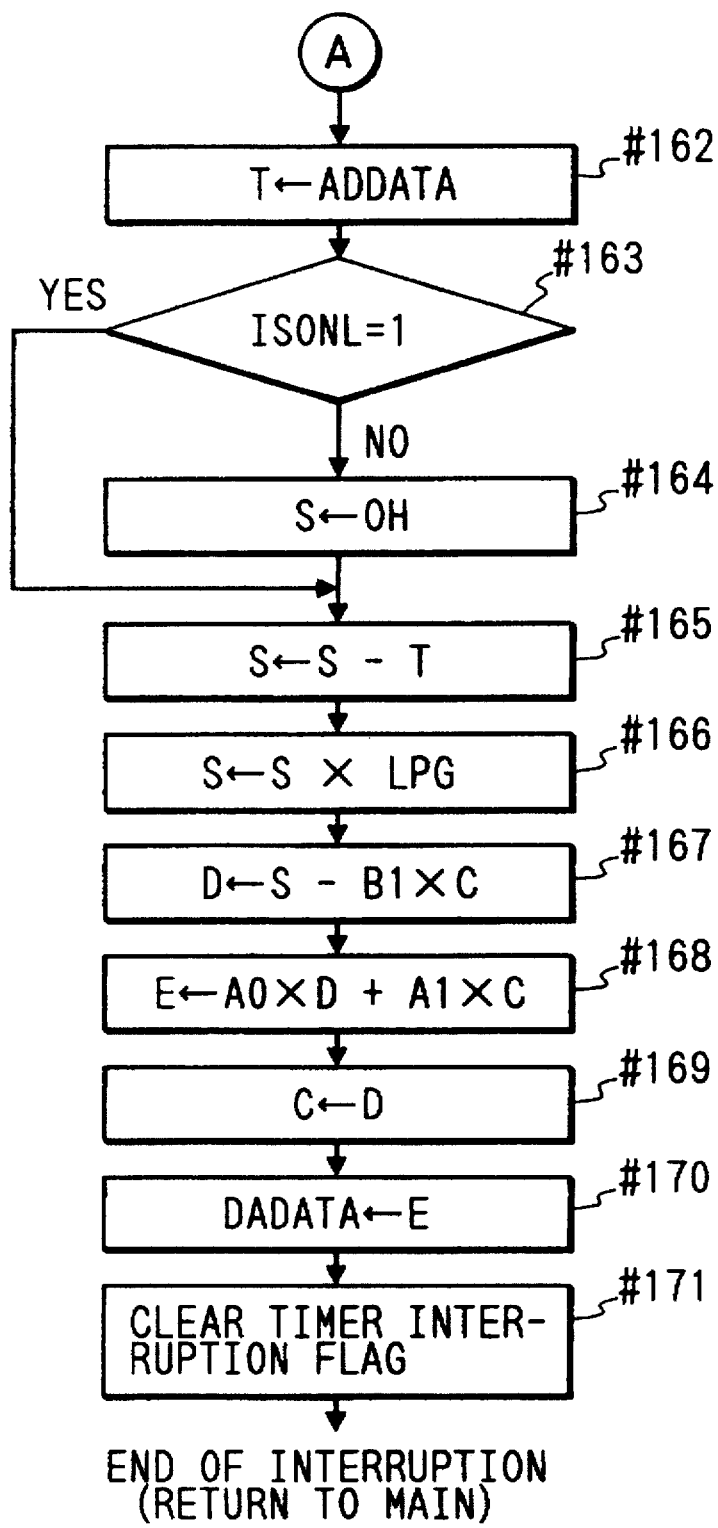
Figure 8B:
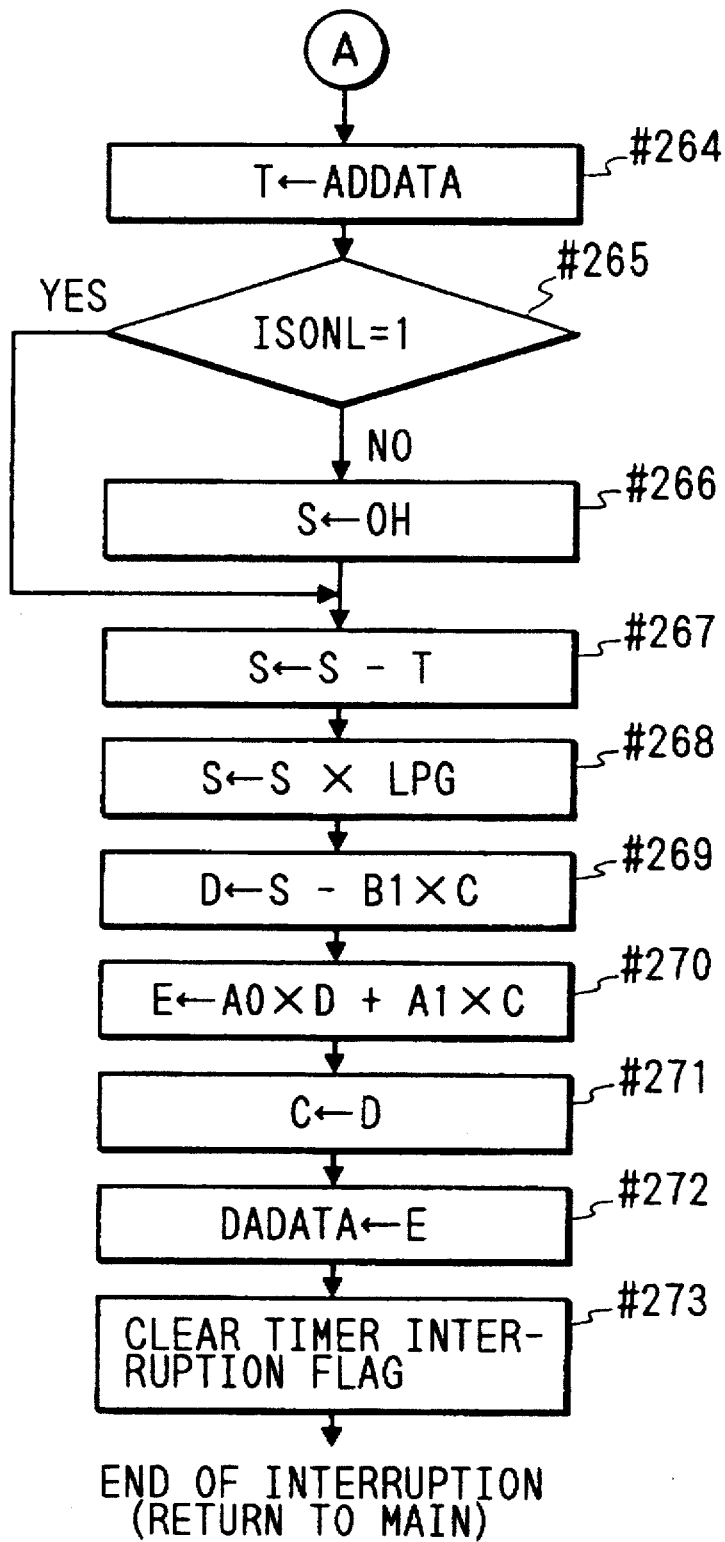
FIG. 8 is comprised of FIGS. 8A and 8B showing the flow charts illustrating the operation of the second embodiment of the present invention.

As for a timer interruption in FIGS. 8A and 8B, processing in steps #250 to #255 is the same as that in steps #150 to #155 in FIGS. 6A and 6B, and a detailed description thereof will be omitted. If it is determined in step #255 that the latch CALL indicating the calibration mode is set to be "1", the flow jumps to step #258 to check the value of the register K in which the number of waveform data storage operations is set. If the value of the register K is not "1", the flow jumps to step #260. If the value of the register K is "1", the value of a memory M (N) indicated by an address counter N in a waveform memory is initialized to "0" in step #259. In step #260, the value of the memory M (N) is added to the value of a register S storing a result corresponding to sensor data, and the result is set in the memory M (N) again. In step #261, the value of the address counter N is incremented by one. As described above, when the camera is set in the calibration mode, a mirror-up operation of the camera is started, and at the same time, the value of the blur sensor is sequentially fetched in the waveform memory. In addition, the same timing data is sequentially added and stored in the same memory M (N) for a plurality of release operations. On the other hand, when it is determined in step #255 that the latch CALL is reset to "0", it is determined that a normal photographing mode is set, and the flow advances to step #256. In step #256, a value obtained upon dividing the value of the memory M (N), which is indicated by the address counter N in the waveform memory, by the value of the register in which the number of waveform storage operations is set is subtracted from the value of the register S in which the sensor data result obtained in steps #250 to #252 is set, and the obtained value is set in the register S again. In step #257, the value of the address counter N is incremented by one. In this case, an average value of data stored in the waveform memory in advance at each timing is subtracted from a sum of an error signal and a camera shake signal output from the sensor. Normally, the camera shake waveform is a random waveform and almost becomes zero by a plurality of averaging operations. For this reason, the average value of the waveform memory is a value almost corresponding to the error signal. Therefore, the calibration mode need not always be set in the stationary state and can also be realized in a state in which the camera is carried. Processing in steps #262 to #273 is the same as that in steps #160 to 171 in FIGS. 6A and 6B, and a detailed description thereof will be omitted.

(Third Embodiment)

A sensor error waveform during a shutter operation may also be stored in a memory in advance, and an example thereof will be described in the third embodiment of the present invention.

The third embodiment of the present invention will be described below with reference to the accompanying drawings.

Figure 9:
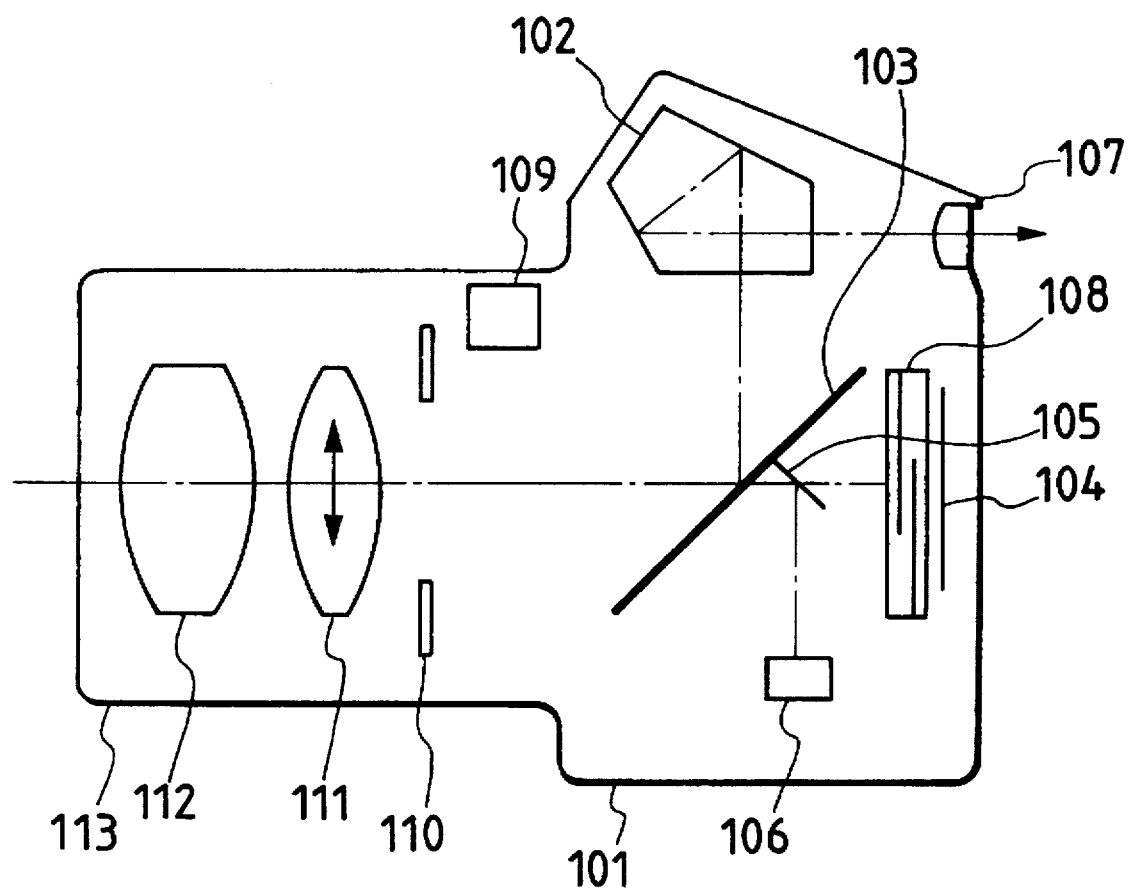
FIG. 9 is a sectional view showing the arrangement of the third embodiment of the present invention.

FIG. 9 is a sectional view schematically showing the arrangement of the third embodiment of the present invention, in which an interchangeable lens 113 incorporating a blur correction apparatus is attached to a single-lens reflex camera 101.

The camera main body 101 includes a pentaprism 102, and a fixed main mirror 103, having half-mirror properties, for reflecting a portion of a light beam to a film surface 104 and the remaining portion to a finder optical system. An auxiliary mirror 105 for guiding a light beam to a distance measuring sensor 106 is retreated below the lower surface of a mirror box during exposure. The camera main body 101 also includes an eyepiece 107 and a shutter unit 108.

The interchangeable lens 113 includes a blur detection sensor 109 for detecting a blur of the camera, an aperture 110, a blur correction lens unit 111 for bending a light beam in accordance with a camera shake amount, and a lens 112.

When a release switch is depressed, an up operation of the main mirror 103 is performed. The forward shutter runs, an image is exposed on the film surface 104, and the rearward shutter runs, thereby finishing exposure.

Figure 10:
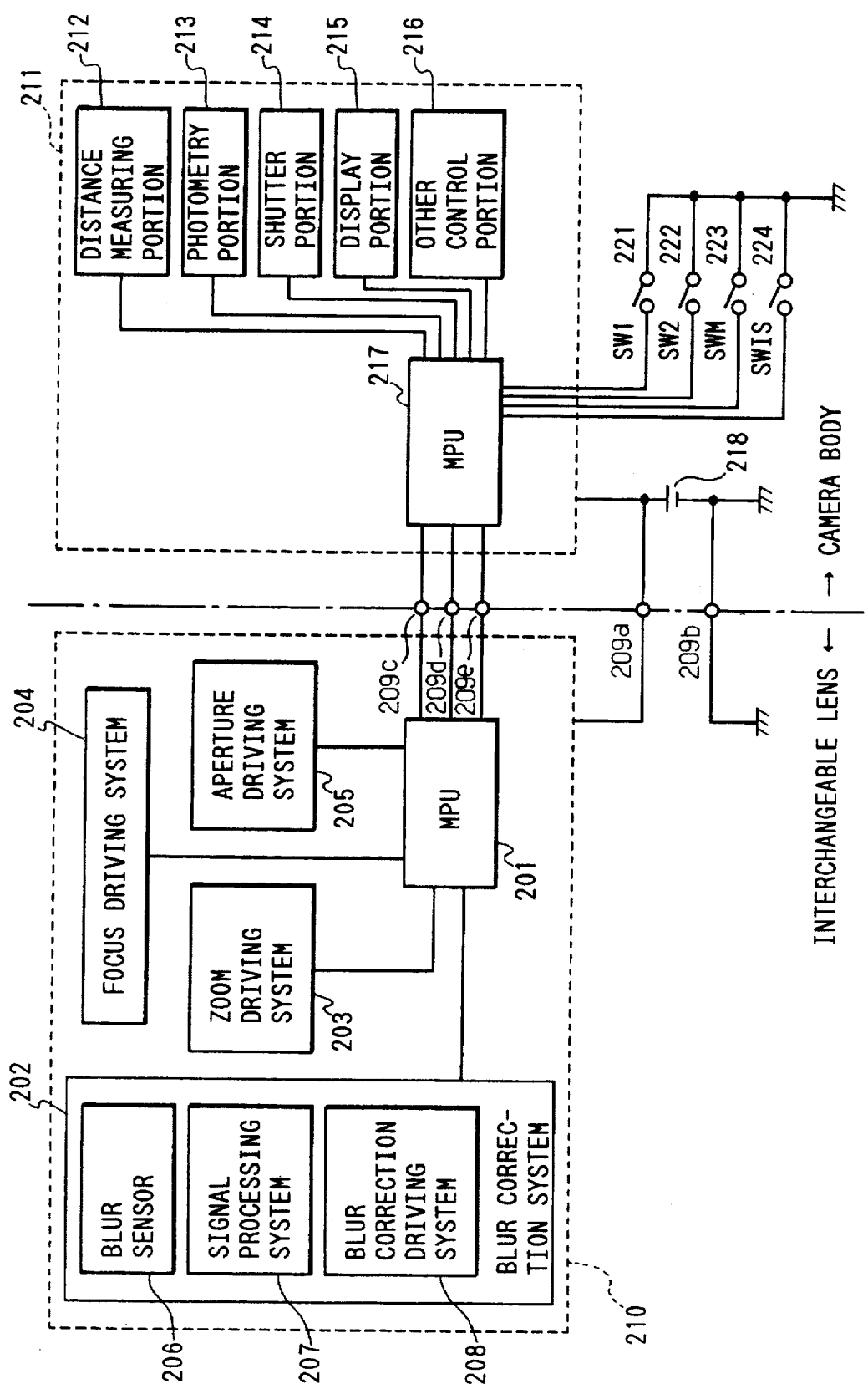
FIG. 10 is a block diagram showing the constituent elements of the third embodiment of the present invention.

FIG. 10 is a block diagram showing a state in which the interchangeable lens incorporating the blur correction apparatus is attached to the single-lens reflex camera shown in FIG. 9.

Referring to FIG. 10, a lens MPU 201 receives communication from the camera body through communication contacts 209c (for a clock signal) and 209d (for signal transmission from the body to the lens), and operates a blur correction system 202, a zoom driving system 203, a focus driving system 204, and an aperture driving system 205 or controls the blur correction system 202 in accordance with the received command value.

The blur correction system 202 is constituted by a blur sensor 206 for detecting a blur of the camera, a signal processing system 207 for performing feedback control on the basis of a signal from the blur sensor 206, and a blur correction driving system 208 for performing an actual blur correction operation in accordance with a control signal from the signal processing system 207.

When a command value is output from the lens MPU 201, or when a switch (not shown) is depressed by a photographer, the zoom driving system 203 drives the lens barrel so as to change the focal length of the lens. The focus driving system 204 drives the focus adjusting lens in accordance with a command value from the lens MPU 201 so as to perform focusing. The aperture driving system 205 stops down the aperture to a set position or restores the aperture to an open state in accordance with a command value from the lens MPU 201.

The lens MPU 201 also transmits states of the lens (a zoom position, a focus position, the state of an aperture value, and the like) and information related to the lens (an open aperture value, a focal length, data necessary for a distance calculation, and the like) to the body side through a communication contact 209e (for signal transmission from the lens to the body).

The lens MPU 201, the blur correction system 202, the zoom driving system 203, the focus driving system 204, and the aperture driving system 205 constitute a lens electrical system 210. The lens electrical system 210 is energized from an internal power supply in the body through a mount Vdd contact 209a and a GND contact 209b.

The camera body incorporates, as an internal electrical system 211, a distance measuring portion 212, a photometry portion 213, a shutter portion 214, a display portion 215, an other control portion 216, and a body MPU 217 for performing management of start and stop of the operations of these elements, exposure calculation, distance calculation, and the like. The internal electrical system 211 is also energized from an internal power supply 218 in the body.

The camera body also has a switch 221 (SW1) for photometry and distance measurement and a release switch 222 (SW2). Generally, the switches 221 and 222 constitute a two-stroke switch. That is, the switch 221 is turned on at the first stroke position of a release button, and the switch 222 is turned on at the second stroke position. An exposure mode selection switch 223 (SWM) is used for a mode change. A mode change operation is performed by, e.g., turning on/off the switch 223 or a simultaneous operation of the switch 223 and other operating members. A blur correction driving (to be abbreviated as "IS" hereinafter) selection switch 224 (SWIS) is turned on when an IS operation is to be selected.

When such a blur correction apparatus is to be adapted in a single-lens reflex camera, the blur correction apparatus is incorporated in the interchangeable lens or realized as an adapter interposed between the body and the lens.

Figure 11:
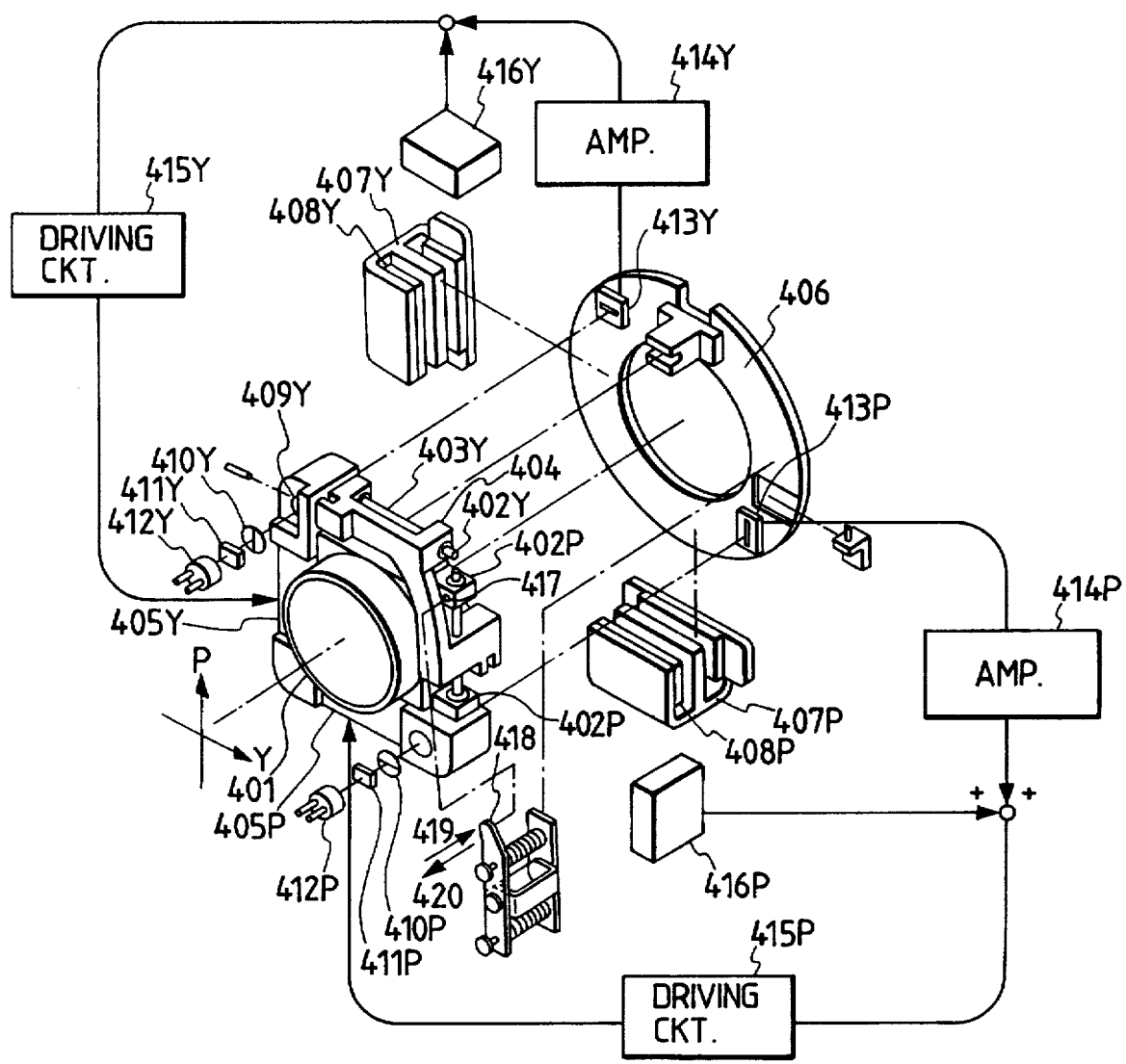
FIG. 11 is a perspective view schematically showing the arrangement of a blur correction mechanism in a blur correction apparatus in FIG. 9.

FIG. 11 is a perspective view showing a blur correction optical mechanism provided to the blur correction apparatus.

The blur correction mechanism is driven in two (a pitch P and a yaw Y) directions perpendicular to each other and also perpendicular to the optical axis. The mechanism has the same arrangement in both directions, and only that in the pitch direction will be described. Referring to FIG. 11, a correction lens holding frame 401 is slidably moved on a pitch slide shaft 403p through a slide bearing 402p. The pitch slide shaft 403p is attached to an intermediate arm 404. The driving force generating mechanism of the lens holding frame 401 will be described below. A coil 405p is attached to the lens holding frame 401. A magnetic circuit constituted by a yoke 407p and a permanent magnet 408p is fixed to a fixed frame 406. Upon energization to the coil 405p, the lens holding frame 401 is driven in the pitch direction. The displacement detecting mechanism of the lens holding frame will be described below. A slit 410p, a condenser lens 411p, an infrared light-emitting diode (IRED) 412p are arranged in a hole 409p formed in the lens holding frame 401. A light-receiving device (PSD) 413p is arranged on the fixed frame 406 opposing the IRED 412p. A near infrared light beam emitted from the IRED 412p is projected on the PSD 413p through the slit 410p. The PSD 413p outputs a signal according to the position of the light beam, thereby detecting the displacement of the lens holding frame 401. When an output from the light-receiving device 413p is amplified by an amplifier 414p and input to the coil 405p through a driving circuit 415p, the lens holding frame 401 is driven to change an output from the light-receiving device 413p. This operation forms a closed system indicated by a solid line and stabilizes at a point (neutral point) where the output from the light-receiving device becomes zero. When an output from a blur sensor 416p, which corresponds to a blur amount, is added to such a system, the lens holding frame 401 precisely follows up using the blur amount as a neutral point and is driven to correct a blur.

Blur correction is performed using such a system. When blur correction is not performed, the blur correction apparatus must be electrically or mechanically fixed (locked) at a predetermined position. The reason for this is as follows. If the blur correction apparatus is not locked while the camera is carried by a user, movement of the blur correction apparatus in a plane perpendicular to the optical axis cannot be suppressed. Therefore, an undesirable swing caused due to vibrations during the carrying may generate a sound upon collision with the peripheral members, or damage and destruction of the image blur correction apparatus may be caused due to a shock. An electrical or mechanical method is conventionally used for such a lock mechanism. In the electrical method, a predetermined signal is input to drive the blur correction apparatus to a predetermined position. From the viewpoint of power savings, however, a method of mechanically locking the image blur correction apparatus is mainly used rather than the electrical method.

The lock mechanism will be described. Referring to FIG. 11, a conical recessed portion 417 is provided as an engaged portion on the correction lens holding frame 401. A conical projecting portion 418 as an engaging portion engages (is locked) with the recessed portion 417 as an engaged portion (in a direction indicated by an arrow 419). With this arrangement, movement of the correction lens holding frame 401 in the pitch and yaw directions is regulated, thereby setting a locked state.

When the locked state is released, the conical projecting portion is moved in a direction indicated by an arrow 420 opposite to the arrow 419 and separated from the conical recessed portion 417 as an engaged portion. The fixed frame 401 integral with the correction lens is set in a disengaged state so as to be freely driven in a plane perpendicular to the optical axis.

Figure 12:
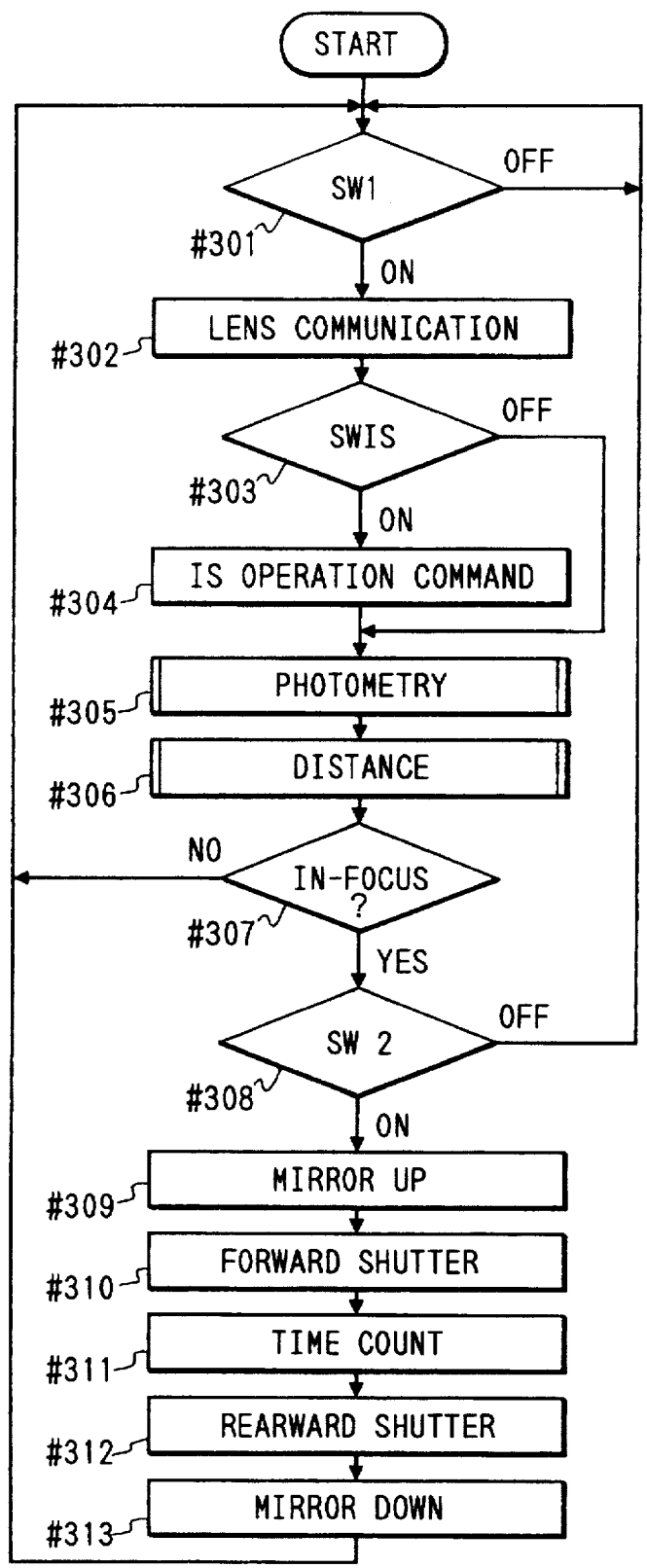
FIG. 12 is a flow chart showing the operation procedures of the third embodiment of the present invention.

The operation of the MPU will be described below with reference to flow charts in FIG. 12 and 13.

The operation of the body MPU 217 will be described below on the basis of the flow chart in FIG. 12.

In step #301, the state of the switch SW1 is detected. When the switch SW1 is turned on, the flow advances to step #302 to perform lens communication. This communication is performed to obtain information necessary for AE and AF. When the body MPU 217 transmits a communication command to the lens MPU 201, the lens MPU 201 transmits information including a focal length, an AF sensitivity, and an open F-number.

In step #303, the ON/OFF state of the switch SWIS is detected. If the switch SWIS is in an ON state, the flow advances to step #304 to transmit an IS operation command to the lens side; otherwise, the flow advances to step #305.

In step #305, a photometry subroutine is executed. In step #306, a distance measurement subroutine is executed.

In step #307, an in-focus state is checked. If an in-focus state is not detected, the flow returns to step #301; otherwise, the flow advances to step #308.

If it is determined in step #308 that the switch SW2 is ON, the flow advances to step #309 to perform a mirror-up operation. In step #310, the forward shutter runs to start exposure. If it is determined in step #308 that the switch SW2 is in an OFF state, the flow returns to step #301.

In step #311, exposure is performed during only a period of time corresponding to a set shutter speed. In step #312, the rearward shutter runs to end exposure.

In step #313, a mirror-down operation is performed, thereby ending the photographing operation.

The operation of the lens MPU 201 will be described below with reference to the flow chart in FIG. 13.

In step #321, when a communication command is received from the body MPU 217 in communication for AE and AF shown in step #302 in FIG. 11, the lens MPU 201 transmits information including a focal length, an AF sensitivity, and an open F-number. In step #322, the moving amount of the focus adjusting lens is calculated by a distance calculation in the body MPU 217. Upon reception of the moving amount, the lens MPU drives the focus adjusting lens.

In step #323, reception of an IS operation command is detected. When YES in step #323, the flow advances to step #326.

In step #326, a blur sensor output and a blur compensation amount are read. The data is A/D-converted in step #327 and converted into data for driving the correction lens in step #328. In step #329, the correction lens is driven to perform blur correction.

In step #330, reception of an SW2 ON signal is detected. When YES in step #330, a blur sensor output and a blur compensation amount are read in step #331. The data is A/D-converted in step #332.

In step #333, mirror shutter vibration waveform data stored in a ROM is read. The data is converted into data for driving the correction lens in step #334. In step #335, the correction lens is driven to perform blur correction.

In step #336, aperture-down and exposure are performed. When it is determined in step #337 that exposure is completed, the aperture is opened in step #338, thereby ending the photographing operation.

As described above, when a mirror shutter vibration having a reproducibility, which cannot be accurately detected by the blur sensor, is corrected by prediction, a blur correction apparatus with high precision can be provided. In addition, when a blur is predictively corrected considering a phase delay of the blur correction system, blur correction can be performed with higher precision.

(Fourth Embodiment)

The fourth embodiment of the present invention will be described below. The arrangement of this embodiment is the same as that in the third embodiment.

In the fourth embodiment, attachment of a tripod must be detected. This can be detected by a tripod detection switch or the like.

As for the operation, when attachment of a tripod is detected, a body MPU 217 transmits this information to a lens MPU 201. During a photographing operation by IS, in step #333 in FIG. 13, mirror shutter vibration data when the camera is supported by a tripod, which is stored in the ROM of the lens MPU 201, is read and corrected.

In addition to detection of attachment of a tripod, the type of the attached camera may also be determined. In step #333 in FIG. 13, mirror shutter vibration data of the corresponding camera type, which is stored in the ROM of the lens MPU 201 in advance, may be read and corrected.

In each of the above embodiments, as for the blur suppression apparatus, an interchangeable lens incorporating the apparatus and a camera integral with a lens, in which the lens main body and the camera main body are constituted integrally with each other, have been exemplified. However, the blur suppression apparatus need not always be incorporated in the interchangeable lens and may have a form of an adapter such as an extender to be interposed between the camera and the lens, or an accessary incorporated in a conversion lens attached in front of the interchangeable lens.

In the third embodiment, an interchangeable lens for electrically performing zoom driving has been exemplified. However, the present invention is not limited to the zoom lens and may also be applied to a single focus lens, as a matter of course. The present invention may also be applied to a zoom lens for manually performing a zoom operation, and the above arrangement may be applied for only aperture and focus driving.

In each of the above embodiments, a vibration gyro is used as the blur detection means. However, other angular velocity sensors or other sensors (a displacement sensor, an angular displacement sensor, a velocity sensor, an acceleration sensor, an angular acceleration sensor, and the like, or an area sensor, and the like) may be used.

In each of the above embodiments, as the blur suppression means, the blur suppression function is achieved by moving an optical member in a plane substantially perpendicular to the optical axis. Alternatively, another blur suppression means such as a variable apical angle prism may be used.

In each of the above embodiments, the present invention is applied to a silver chloride camera. However, the present invention can be similarly applied to other photographing devices such as a video camera, and other optical equipment as long as the device operates to generate an output error in the blur detection means.

The arrangements or their technical elements of the above embodiments may be combined as needed.

As has been described above, according to the embodiments of the present invention, when a specific signal is output from a blur detection means while an optical equipment is set in a predetermined state, e.g., a blur suppressing or preventing operation is prevented from becoming inaccurate when an inaccurate signal is output from the blur detection means by a shutter operation during the release operation of a camera.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus adapted to be used with a blur suppression device, comprising:

first means for storing a predetermined signal;

second means for determining whether an impact occurs due to operation of a movable member; and third means for synthesizing a first signal indicating an image blur state and the predetermined signal stored in said first means in accordance with a determination result of said second means so as to form a second signal for operating the blur suppression device, thereby preventing an error operation of the blur suppression device due to impact.

2. An apparatus according to claim 1, wherein said first means includes means for storing a signal portion contained in the first signal and not to be used for blur suppression.

3. An apparatus according to claim 2, wherein said second means includes means for determining that the first signal containing a signal portion not to be used for blur suppression is in an undesired state.

4. An apparatus according to claim 3, wherein said third means includes means for synthesizing the first signal and the predetermined signal stored in said first means so as to form a desired signal used for blur suppression when said second means determines that the first signal is in the undesired state.

5. An apparatus according to claim 4, wherein said third means includes means for subtracting the signal portion stored in said first means and not to be used for blur suppression from the first signal.

6. An apparatus according to claim 1, wherein the first signal is a detection output signal from a blur detection portion for detecting image blur, and said first means includes means for storing a signal portion not to be used as a driving signal for operating a blur suppression portion for suppressing or preventing blur in accordance with the detection output signal from the blur detection portion.

7. An apparatus according to claim 6, wherein said second means includes means for determining that the detection output signal containing the signal portion not to be used as the driving signal is in an undesired state, without using the detection output signal.

8. An apparatus according to claim 7, wherein said third means includes means for synthesizing the first signal and the signal portion not to be used as the driving signal so as to form a driving signal when said second means determines that the first signal is in the desired state.

9. An apparatus according to claim 1, wherein said second means includes means for performing impact determination in accordance with a state of an acting portion which influences a signal output portion for outputting the first signal.

10. An apparatus according to claim 9, wherein the signal output portion includes a blur detection portion for detecting a fluctuation of an equipment, and said second means includes means for performing impact determination in accordance with the state of the acting portion for applying an impact to the blur detection portion upon acting on the blur detection portion.

11. An apparatus according to claim 10, wherein said second means includes means for performing impact determination in accordance with one of a state of a shutter member of a camera and a state of a mirror member moved to change a traveling direction of a photographing light beam.

12. An apparatus according to claim 9, wherein said first means includes means for storing a signal which is output from the signal output portion due to an influence of an action of the acting portion.

13. An apparatus according to claim 12, wherein said third means includes means for subtracting the signal which is output from the signal output portion due to an influence of the action of the acting portion, and which is stored in said first means, from the first signal when said second means determines that the action of the acting portion influences the signal output portion.

14. An apparatus according to claim 1, wherein said first means includes updating means for updating a predetermined signal stored in said first means.

15. An apparatus according to claim 1, wherein said apparatus is adaptable to an optical equipment.

16. An apparatus according to claim 15, further comprising a blur suppression device.

17. An apparatus according to claim 15, wherein said apparatus is adaptable to a camera.

18. A blur suppression apparatus comprising:

a blur suppression device that suppresses image blur;

first means for storing a predetermined signal;

second means for determining whether an impact occurs due to operation of a movable member; and third means for synthesizing a first signal indicating an image blur state and the predetermined signal stored in said first means in accordance with a determination result of said second means so as to form a second signal for operating said blur suppression device, thereby preventing an error operation of said blur suppression device due to impact.

19. A camera comprising:

first means for storing a predetermined signal;

second means for determining whether an impact occurs due to operation of a movable member; and third means for synthesizing a first signal indicating an image blur state and the predetermined signal stored in said first means in accordance with a predetermination result from said second means so as to form a second signal for operating a blur suppression device, thereby preventing an error operation of the blur suppression device due to impact.

* * * * *

UNITED STATES PATENT AND TRADEMARK OFFICE
CERTIFICATE OF CORRECTION

PATENT NO. : 5,615,397
DATED : March 25, 1997
INVENTOR(S) : YASUHIKO SHIOMI, ET AL.

It is certified that error appears in the above-identified patent and that said Letters Patent is hereby corrected as shown below:

<u>COLUMN 4</u>

Line 14, "photomerry" should read --photometry--.
    Line 16, "photomerry" should read --photometry--.
    Line 19, "tomerry" should read --tometry--.

<u>COLUMN 11</u>

Line 37, "interchangeablelens." should read --interchangeable lens.--.

Signed and Sealed this

Nineteenth Day of August, 1997

Attest:

BRUCE LEHMAN

Attesting Officer      Commissioner of Patents and Trademarks